July 27, 1948. H. S. FULLERTON 2,445,876
APPARATUS FOR TESTING TUBES BY FLUID PRESSURE
Filed March 31, 1945 2 Sheets-Sheet 1

INVENTOR.
Herbert S. Fullerton
BY
ATTORNEY

July 27, 1948.  H. S. FULLERTON  2,445,876
APPARATUS FOR TESTING TUBES BY FLUID PRESSURE
Filed March 31, 1945  2 Sheets-Sheet 2

INVENTOR.
Herbert S. Fullerton
BY
ATTORNEY

Patented July 27, 1948

2,445,876

UNITED STATES PATENT OFFICE 2,445,876

APPARATUS FOR TESTING TUBES BY FLUID PRESSURE

Herbert S. Fullerton, Merion, Pa., assignor to The Baldwin Locomotive Works, a corporation of Pennsylvania Application March 31, 1945, Serial No. 585,971

4 Claims. (Cl. 73—37)

This invention relates generally to tube testing equipment and particularly for testing tubes under hydraulic pressure.

Heretofore it has been customary to test pipe only under circumferential tensile stresses as by subjecting the same to internal hydraulic pressure. It is an object of my invention to overcome the deficiencies of this method of testing by providing improved means whereby the tube may be subjected to tension stresses longitudinally as well as circumferentially.

A further object is to provide improved means for subjecting the tube to longitudinal stresses while simultaneously subjecting the tube to hydraulically induced circumferential tension stresses.

A still further object is to provide improved longitudinal and circumferential tube testing apparatus that is relatively simple and economical in construction, operation and maintenance and can be operated with dispatch, accuracy and ease of manipulation.

Other objects and advantages will be more apparent to those skilled in the art from the following description of the accompanying drawings in which.

Figure 1:
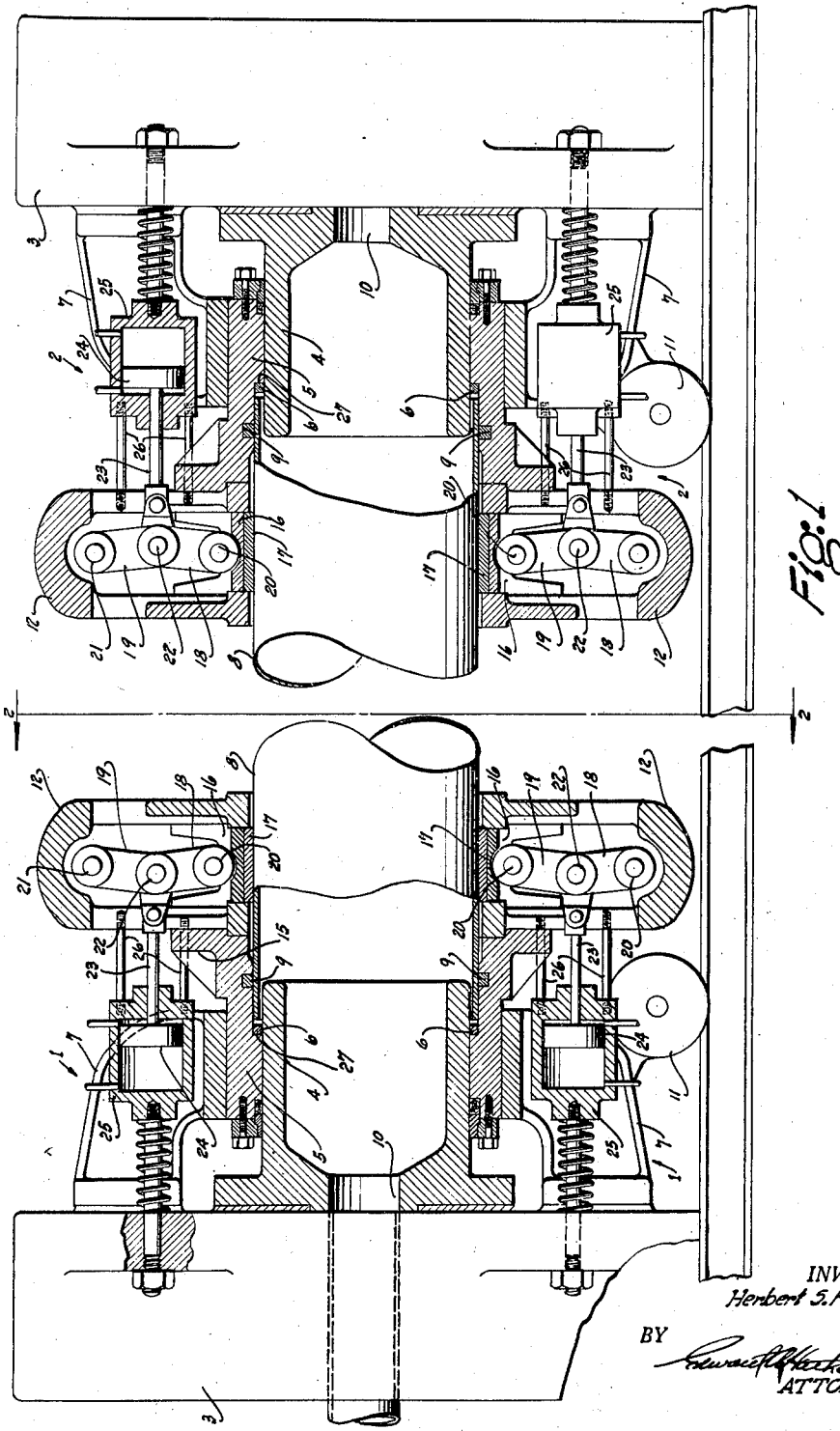
Fig. 1 is a fragmentary sectional view of my improved testing apparatus.

In the drawings I have shown for purposes of illustration an apparatus having two gripping mechanisms generally indicated at 1 and 2 located respectively at each end of the tube under test, these mechanisms being substantially identical in construction and operation and therefore the description of one will suffice for both. A relatively large vertical standard 3 has a cylindrical sleeve 4 on which an axially movable packing gland 5 and suitable annular packing 6 is mounted. The packing gland 5 is slidably supported in a series of bosses or guides 7 supported on and projecting axially from the standard 3. A pipe 8 to be tested is supported within a recessed end of gland 5 containing the packing 6 while radial packing 9 surrounds the tube. Fluid pressure from a pump or other source may be suitably admitted to the interior of the tube 8 through a passage 10 and thereby subject the tube to an internal pressure and accordingly a circumferential tension. The standard 3 may be moved longitudinally on any suitable wheel and track construction 11 to permit the tube to be placed in position or to be removed while suitable locking means such as pins and holes may be employed to lock the standards against longitudinal movement during the longitudinal tension testing operation to now be described.

Figure 2:
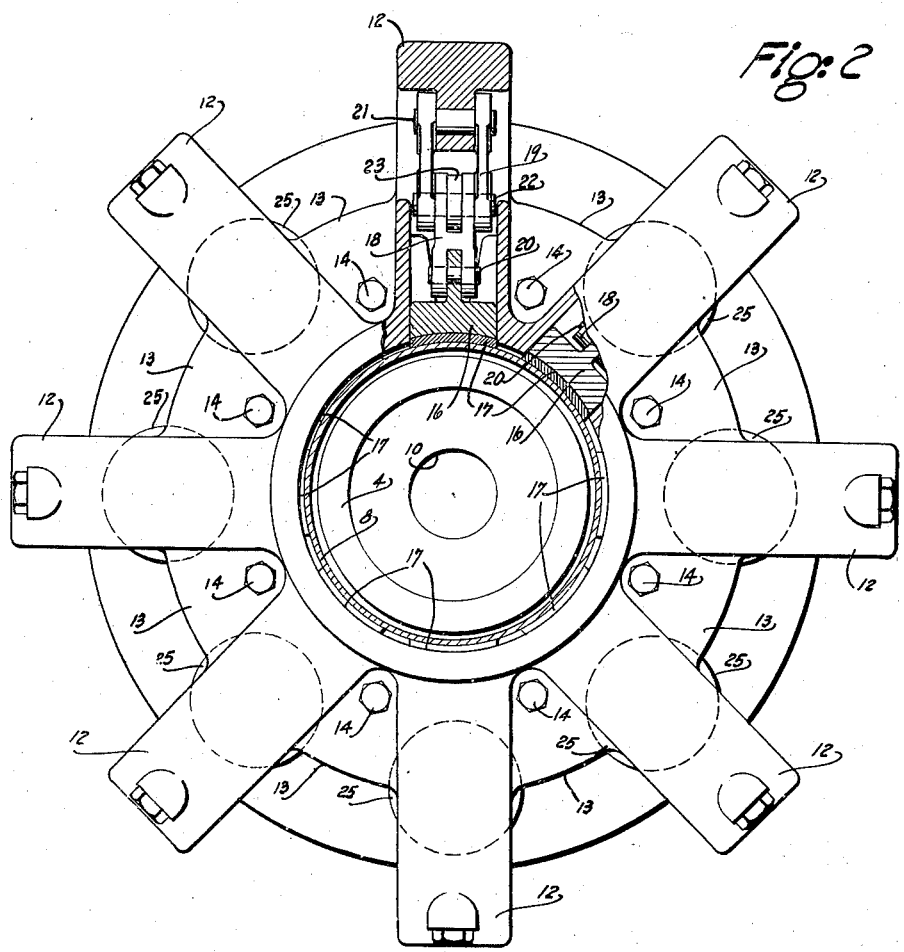
Fig. 2 is a transverse section taken substantially on the line 2—2 of Fig. 1 with certain parts broken away to show details of construction.
Figure 3:
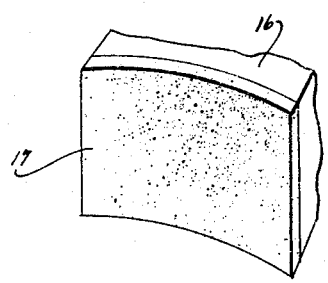
Fig. 3 is a fragmentary perspective of one of the grips for imposing a longitudinal tension load on the tube.

The longitudinal testing mechanism comprises a series of radially disposed guiding heads 12 of any suitable number located around the circumference of the pipe as shown in Fig. 2, these heads being connected together as a unit through suitable circumferentially extending webs 13 which, in turn, are secured by bolts or screws 14 to a radial flange 15 of the packing gland member 5. Each guide has a radially movable grip or shoe 16 of any suitable cross-sectional shape preferably rectangular as shown in Fig. 3. The inner end of this grip is curved to conform to the radius of the pipe and is provided with a roughened gripping surface 17 which may be carborundum integrally formed on the main metal body of the grip, as by being formed directly thereon under heat and pressure in a manner well-known in the manufacture of carborundum products, or if desired, the grip 16 may be provided with well-known gripping teeth used in testing tension specimens in materials testing machines. Hence, the same need not be shown or described herein as such teeth are well-known in the art. To move the grips into and out of gripping position, I have provided toggle links 18 and 19 respectively pivotally connected to the grip at 20 and to the guide head 12 at 21 while the links are pivotally connected together at 22 for connection through a pivotal link with a piston rod 23 whose piston 24 is disposed within a cylinder 25 for movement in either direction by any suitable fluid power such as hydraulic pressure. The cylinders 25 are connected to and supported by guides 12 through rods 26 so that the cylinders are adapted to have movement with the guides and gland 5 as a unit.

*Operation.*—One of the gripping mechanisms such as 1 is moved away from the other mechanism 2 sufficiently to allow a tube 8 under test to be placed in position axially of the glands 5 whereupon the gripping mechanism 1 is moved so that the tube is fully telescoped within the packing glands at each end. The standard 3 is then locked in position and fluid pressure is supplied from any suitable source such as a pump to the outer sides of pistons 24 to cause the toggle mechanism 18 and 19 to force the individual grips radially inward to firmly engage the tube 8.

Testing fluid pressure is then admitted through passage 10 to the interior of the tube which subjects the same to a circumferential tension stress and simultaneously this pressure acts on the exposed radial areas 27 of packing glands 5 to impose a longitudinal force thereon in directions tending to force the gripping heads apart. This longitudinal force is transmitted through flange 15 and guides 12 to the grips 16 and thence through the gripping surface 17 to the tube to pull the same longitudinally to impose a longitudinal stress therein. During such movement of the gland it is seen that cylinder 25 will float with the guide 12 and gland 5. Upon completion of the test, fluid pressure is released from the interior of tube 8 and also from the outer ends of piston 24 whereupon fluid pressure supplied to the inner sides of these pistons will release the grips 16. Thereupon the standard 3 may be unlocked and moved lengthwise away from the tube to permit removal of the latter.

From the foregoing description it is seen that I have provided an extremely simple, effective and rugged mechanism whereby the tube may be subjected to tension stresses both circumferentially and longitudinally and in the specific aspect of this mechanism the foregoing multiple testing stresses are effected by the application of a common fluid pressure which automatically creates a radial fluid pressure within the tube and a longitudinal fluid force for pulling on the tube. It is, of course, clear from the disclosure herein that the longitudinal force is determined by the difference in area between the annular area of the pipe and the annular recessed area 27 of gland 5. The longitudinal force may be increased or decreased merely by providing a suitable differential area. Also, to accommodate the apparatus to pipes of different diameters, it is only necessary to have additional sets of substitute grips 16 with the gripping faces 17 curved to suit the diameter of pipe under test.

It will of course be understood that various changes in details of construction and arrangement of parts may be made by those skilled in the art without departing from the spirit of the invention as set forth in the appended claims.

I claim:

1. Apparatus for testing a tube under multiple stresses comprising, in combination, means for subjecting the tube to a radial fluid pressure so as to create a circumferential stress in the tube, fluid pressure operated means for mechanically engaging the tube to transmit a longitudinal force thereto, a normally anchored stationary sleeve, an axially movable packing gland surrounding said sleeve for engagement therewith and to which said mechanical engaging means is connected for movement together as a unit, and means providing a fluid pressure area upon which fluid within the tube acts so as to move and slide said unit axially along said sleeve thereby to create and impose a longitudinal load force on the tube.

2. The combination set forth in claim 1 further characterized in that the packing gland has an internally exposed annular area surrounding the sleeve against which fluid within the tube acts to move the unit along said sleeve to produce said longitudinal force.

3. The combination set forth in claim 1 further characterized in that the means for mechanically engaging the tube includes fluid operated pistons and cylinders and radially movable gripping elements actuated by said pistons and cylinders.

4. The combination set forth in claim 1 further characterized in that the means for mechanically engaging the tube includes fluid operated pistons and cylinders and radially movable gripping elements actuated by said pistons and cylinders, and means for supporting said pistons and cylinders so that they move as an integral part of the unit while the longitudinal testing force is being produced.

HERBERT S. FULLERTON.

REFERENCES CITED

The following references are of record in the file of this patent:

UNITED STATES PATENTS

| Number | Name | Date |
|---|---|---|
| 1,034,426 | Crisandt | Aug. 6, 1912 |
| 1,851,345 | Brown et al. | Mar. 29, 1932 |
| 2,242,658 | Protin | May 20, 1941 |
| 2,293,471 | Protin | Aug. 18, 1942 |
| 2,336,524 | Bannister | Dec. 14, 1943 |